(12) United States Patent
Russell

(10) Patent No.: US 7,574,842 B2
(45) Date of Patent: Aug. 18, 2009

(54) APPARATUS FOR MOUNTING PHOTOVOLTAIC POWER GENERATING SYSTEMS ON BUILDINGS

(75) Inventor: Miles C. Russell, Lincoln, MA (US)

(73) Assignee: Schott Solar, Inc., Billerica, MA (US)

( * ) Notice: Subject to any disclaimer, the term of this patent is extended or adjusted under 35 U.S.C. 154(b) by 371 days.

(21) Appl. No.: 11/243,758

(22) Filed: Oct. 5, 2005

(65) Prior Publication Data

US 2006/0053706 A1 Mar. 16, 2006

Related U.S. Application Data

(63) Continuation-in-part of application No. 10/506,145, filed as application No. PCT/US02/29020 on Sep. 12, 2002, now Pat. No. 7,435,897.

(60) Provisional application No. 60/371,576, filed on Apr. 11, 2002.

(51) Int. Cl.
| | |
|---|---|
| *E04C 2/38* | (2006.01) |
| *E04C 5/00* | (2006.01) |
| *E04B 1/38* | (2006.01) |
| *H02N 6/00* | (2006.01) |
| *H01L 31/042* | (2006.01) |
| *F24J 2/38* | (2006.01) |
| *A47G 29/02* | (2006.01) |
| *E04G 3/20* | (2006.01) |
| *E06B 7/28* | (2006.01) |

(52) U.S. Cl. .................. 52/768; 52/713; 52/475.1; 136/244; 126/600; 248/237

(58) Field of Classification Search ............... 52/173.3, 52/768, 713, 475.1; 136/244; 126/600; 248/237, 248/678, 188.1, 346.01
See application file for complete search history.

(56) References Cited

U.S. PATENT DOCUMENTS

| 4,000,734 | A | | 1/1977 | Matlock et al. | |
|---|---|---|---|---|---|
| 4,223,667 | A | * | 9/1980 | Paymal | 126/621 |
| 4,269,173 | A | * | 5/1981 | Krueger et al. | 126/634 |
| 4,316,448 | A | | 2/1982 | Dodge | |
| 4,371,139 | A | * | 2/1983 | Clark | 248/237 |
| 4,421,943 | A | * | 12/1983 | Withjack | 136/246 |
| 4,611,090 | A | | 9/1986 | Catella et al. | |
| 4,677,248 | A | * | 6/1987 | Lacey | 136/244 |

(Continued)

*Primary Examiner*—Brian E. Glessner
*Assistant Examiner*—Branon C Painter
(74) *Attorney, Agent, or Firm*—Pandiscio & Pandiscio

(57) ABSTRACT

Rectangular photovoltaic (PV) modules are mounted on a building roof by mounting stands that are distributed in rows and columns. Each stand comprises a base plate and first and second different height brackets attached to opposite ends of the base plate. Each first and second bracket comprises two module-support members. One end of each module is pivotally attached to and supported by a first module-support member of a first bracket and a second module-support member of another first bracket. At its other end each module rests on but is connected by flexible tethers to module-support members of two different second brackets. The tethers are sized to allow the modules to pivot up away from the module-support members on which they rest to a substantially horizontal position in response to wind uplift forces.

15 Claims, 9 Drawing Sheets

U.S. PATENT DOCUMENTS

| | | |
|---|---|---|
| 4,691,491 A | 9/1987 | Lilley |
| 5,125,608 A * | 6/1992 | McMaster et al. ......... 248/163.1 |
| 5,180,442 A * | 1/1993 | Elias ........................... 136/251 |
| 5,228,924 A * | 7/1993 | Barker et al. ................ 136/246 |
| 5,333,602 A | 8/1994 | Huang |
| 5,409,549 A * | 4/1995 | Mori ........................... 136/244 |
| 5,505,788 A | 4/1996 | Dinwoodie |
| 5,590,503 A | 1/1997 | Spronken |
| 5,647,915 A * | 7/1997 | Zukerman ................... 136/251 |
| 5,740,996 A | 4/1998 | Genschorek |
| 6,046,399 A * | 4/2000 | Kapner ........................ 136/244 |
| 6,148,570 A * | 11/2000 | Dinwoodie et al. ......... 52/173.3 |
| 6,233,881 B1 * | 5/2001 | Rainbolt ......................... 52/83 |
| 6,307,144 B1 | 10/2001 | Mimura et al. |
| 6,370,828 B1 | 4/2002 | Genschorek |
| 6,414,237 B1 | 7/2002 | Boer |
| 6,563,040 B2 * | 5/2003 | Hayden et al. .............. 136/244 |
| 6,570,084 B2 * | 5/2003 | Dinwoodie .................. 136/251 |

* cited by examiner

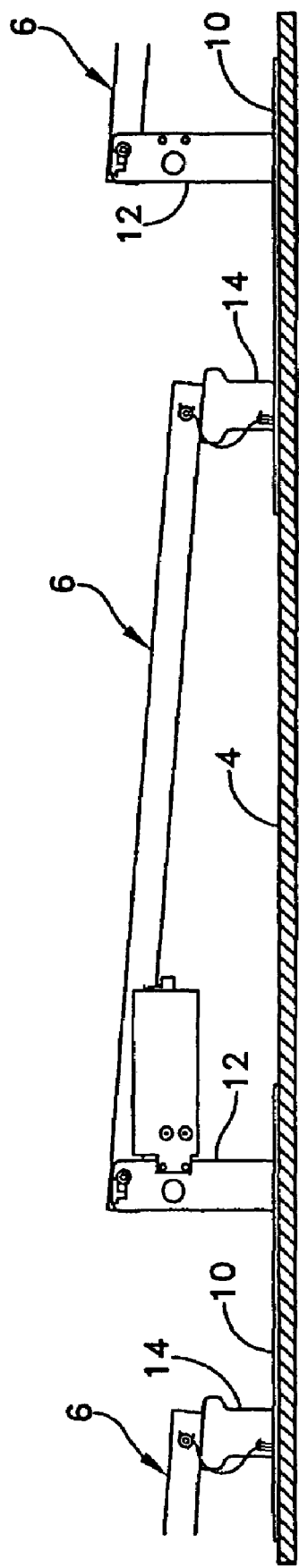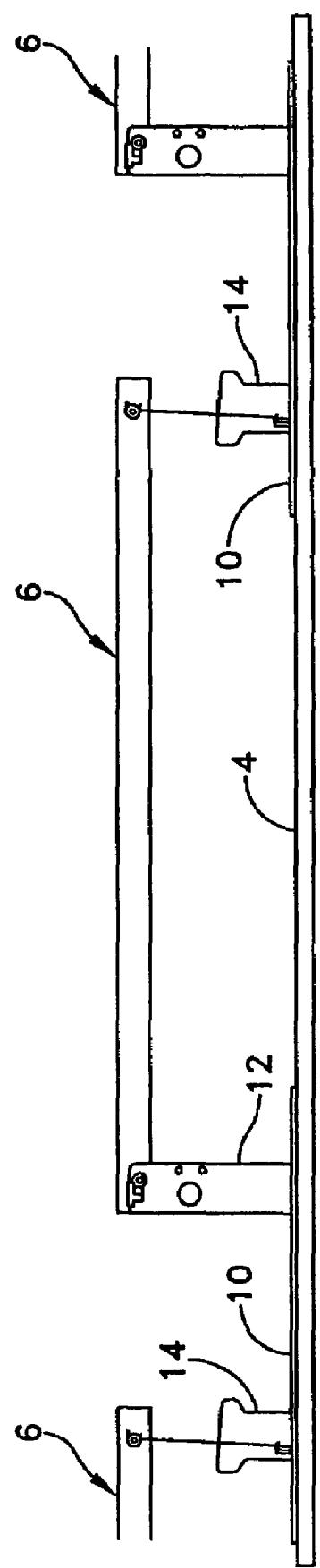

APPARATUS FOR MOUNTING PHOTOVOLTAIC POWER GENERATING SYSTEMS ON BUILDINGS

This application is a continuation in part of U.S. patent application Ser. No. 10/506,145, filed Aug. 31, 2004 now U.S. Pat. No. 7,435,897 by Miles C. Russell for "Apparatus And Method For Mounting Photovoltaic Power Generating Systems On Buildings", which claims the benefit of PCT International Application No. PCT/US02/29020 filed Sep. 12, 2002 and Provisional Application Ser. No. 60/371,576, filed Apr. 11, 2002.

This invention was made using government funds under Department of Energy Subcontract No. NREL NDO-2-30628-05.

FIELD OF THE INVENTION

This invention relates generally to photovoltaic power generating systems and in particular to improved means for mounting photovoltaic modules on the roofs of buildings.

BACKGROUND OF THE INVENTION

As used herein the term "PV module" identifies a photovoltaic power generating unit in the form of an integrated structure comprising a plurality of electrically interconnected photovoltaic cells and means for supporting and protecting the cells. A variety of systems and methods have been devised for mounting PV modules and associated components of solar electric (PV) power generating systems on the rooftops of businesses, factories, schools, hospitals, commercial establishments and the like, and the market for such systems is growing rapidly in the United States and elsewhere. As the cost per watt has dropped in recent years for photovoltaic units, the need for improving methods of mounting photovoltaic modules to building roofs has become more critical. More precisely, as the cost of solar cells per se has declined, the non-solar cell components required for installing a functioning photovoltaic system become more critical with respect to overall system costs. However, care must be taken to insure that photovoltaic systems are installed with due respect to environmental factors such as wind-loading and environmental stresses, and preserving building integrity, notably, avoiding the use of mechanical fasteners that penetrate the roof covering.

My copending application Ser. No. 10/506,145, cited supra, discloses a system for mounting PV modules on a flat building roof that (1) is adapted to mount PV modules at a selected tilt angle, e.g., in the range of 0°-15°, to benefit annual energy production, (2) allows the PV modules to shift from a tilt position to a near horizontal position in response to pressure differentials caused by extreme winds, whereby to release wind pressure and reduce or substantially eliminate wind uplift forces, (3) eliminates the need for mechanically or adhesively attaching the module-mounting structure to the building roof, whereby to preserve the integrity and waterproof characteristics of the supporting roof structure, and (4) provides for walkways between rows of solar modules for easy access for servicing and repair.

The mounting system disclosed in my above-identified copending application utilizes a plurality of mounting stands that are intended to rest on a supporting roof, with each mounting stand consisting of a base plate, and first and second brackets attached to opposite ends of the base plate. These mounting stands are distributed in spaced relation to one another on a supporting roof in a row and column arrangement. The first bracket has a fixed height and the second bracket has a telescoping construction that permits its effective height to vary from a first minimum value that is less than that of the first bracket to a second maximum value that is substantially the same as the first bracket. Each bracket has dual members for supporting two PV modules. The PV modules are rectangular and are supported by attaching mounting studs located adjacent to each corner of each module to different mounting brackets. More specifically, two corners of each module are mounted to different first brackets and the other two corners of each module are attached to different second brackets. The distributed mounting stands and the supported PV modules provide sufficient weight to resist movement by wind uplift forces resulting from wind velocities of up to about 70 miles per hour. Under higher velocity winds, e.g., winds up to about 110 miles per hour, the ability of the mounting stands and the supported PV modules to withstand movement is enhanced and preserved by the ability of the second brackets to extend their heights so as to shift the modules to a near horizontal position, thereby releasing wind pressure on the modules and reducing wind uplift forces.

Experience has revealed that sometimes the telescoping second brackets tend to bind instead of telescoping readily as designed, restricting the ability of the mounted PV modules to shift to near horizontal position and thereby reduce module-distorting forces caused by wind pressure. The binding problem is related to quality control in the manufacture of the telescoping brackets, and may be worsened by bracket misalignment. It has been observed also that installers sometimes get confused and install the smaller telescoping brackets in reverse. Such error is troublesome since the first and second brackets each have horizontally elongated slots for receiving mounting studs that protrude from opposite sides of the modules, and reversing the telescoping brackets, for example, makes it possible for the modules' mounting studs to slip out of the elongated slots and/or allows the modules to shift in such a way as to prevent them from pivoting upwardly as required when subjected to uplifting wind forces.

OBJECTS AND SUMMARY OF THE INVENTION

The primary object of the present invention is to improve on the mounting system disclosed in my above-identified copending application Ser. No. 10/506,145.

A more specific object is to provide apparatus for mounting PV modules on a flat roof that comprises improved means for allowing the modules to pivot from a tilted position to a substantially horizontal position in response to pressure differentials caused by extreme winds, whereby to release wind pressure and reduce or substantially eliminate module-distorting or module-destructing wind uplift forces.

Another object is to provide a mounting system that has substantially the same advantages as the system disclosed in said copending application Ser. No. 10/506,145.

The foregoing objects are achieved by replacing the second telescoping brackets disclosed in my prior copending application with brackets that have a fixed height less than that of the taller first brackets and that serve two functions: (1) they act as supports on which the PV modules rest and coact with the taller first brackets to support the PV modules in a tilted position and (2) they function as anchors for tethers that are connected to the PV modules, the tethers being long enough to allow the PV modules to pivot to a substantially horizontal position in response to high wind forces.

Other objects, features and advantages of the invention are described or rendered obvious by the following detailed description which is to be considered together with the accompanying drawings.

THE DRAWINGS

FIGS. 2 and 3 are fragmentary sectional views in side elevation of the same system.

DETAILED DESCRIPTION OF THE INVENTION

Figure 1:
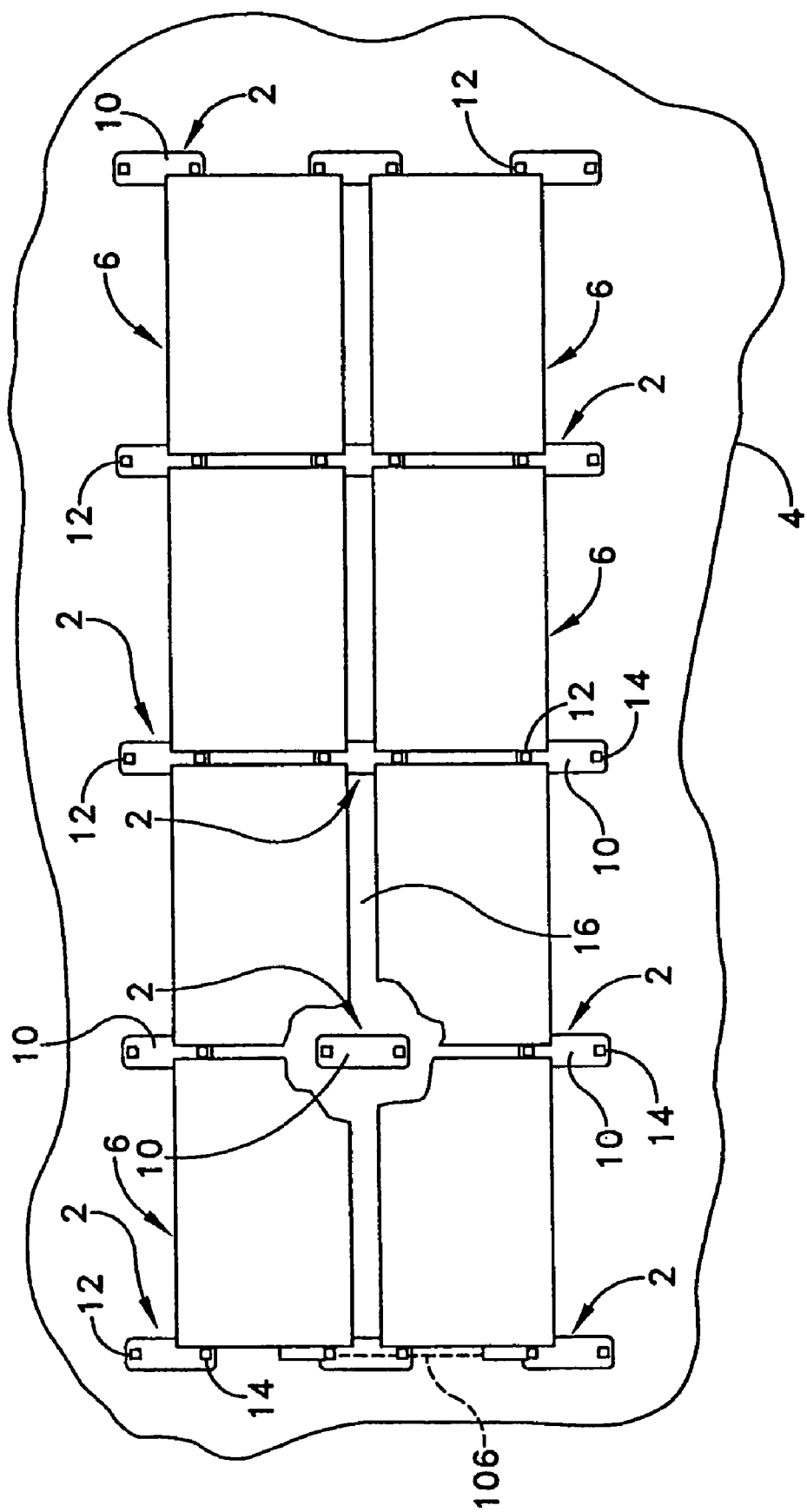
FIG. 1 is a plan view illustrating a number of PV modules and apparatus embodying the present invention for mounting the modules on a roof, with certain of the PV modules being broken away for illustrative purposes.

The present invention provides a mounting system that comprises a set of mounting stands 2 that are distributed on a supporting roof structure 4 and support a plurality of PV modules 6, with each stand consisting of a base plate 10 and two mutually spaced brackets 12 and 14 that are attached to opposite ends of the base plate. The brackets 12 are of fixed height. The other brackets 14 also have a fixed height shorter than brackets 12 in order to provide a selected angle of tilt to the PV modules.

The mounting stands are laid out on a flat roof in a rectangular grid pattern of rows and columns as shown in FIG. 1, with the row and column spacing being determined by the dimensions of the solar modules panels to be mounted as well as the tilt angle. Preferably the base plates 10 of the mounting stands are sized to introduce a defined separation distance between the rows of PV modules 6, with that separation distance being set to minimize row-to-row shading and also to provide spaces 16 between adjacent rows of modules that are wide enough to serve as walkways for easy access to the modules for service and repair. Spaces 16 also serve to provide ingress and egress for ambient air circulation for both improved convective cooling of the PV modules and equalization of air pressure in high wind conditions. Base plates 10 also are sized so as to distribute the dead load and reduce the downward pressure on the roof from the weight of the mounting stands and the modules supported by the mounting stands.

In the preferred embodiment of the invention, the base plates and the brackets are made of sheet metal, e.g., aluminum or stainless steel, but they could be made of some other material such as a concrete mix. If desired, the base plates may be provided with an adhered cushioning material on their undersides to protect the roof surface. Such a cushioning material may be desirable where the base plates rest on a waterproofing diaphragm covering a roof surface.

The base plates 10 are provided with fastener elements for securing the brackets in place. Preferably, but not necessarily, the fasteners are in the form of vertically-projecting threaded studs 18 (FIGS. 5, 10) that are permanently secured to the base plates and receive nuts 19 to lock the brackets in place. Of course, the fastener elements could take other forms, e.g., they may be separate screw fasteners inserted into holes in the base plate, with those holes being countersunk to accommodate the heads of the fasteners, so as to prevent the fastener heads from injuring the underlying roof surface.

Figure 4:
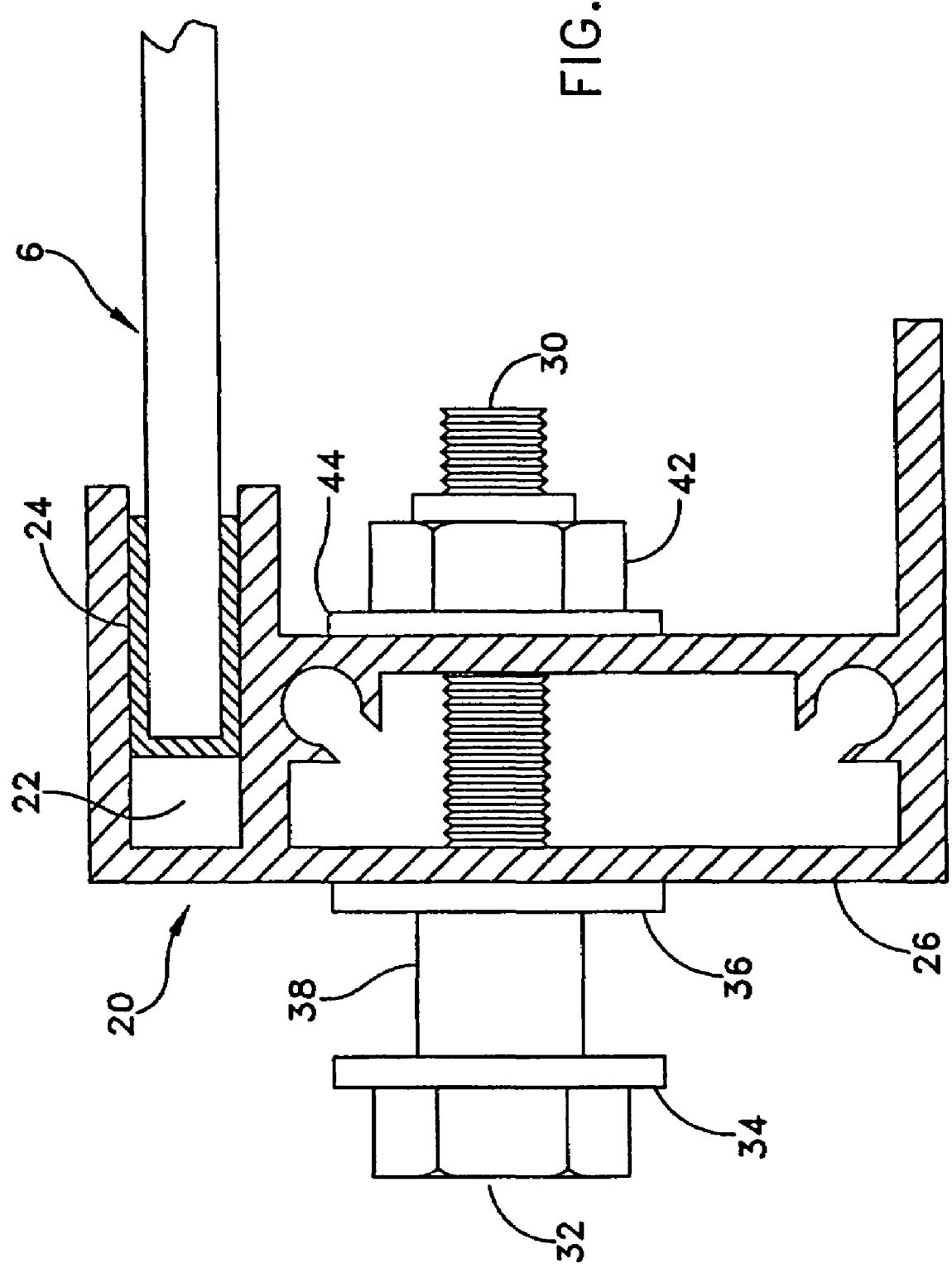
FIG. 4 is a fragmentary cross-sectional view of a PV module showing one form of mounting stud arrangement.

Referring to FIG. 4, each PV module 6 is provided at its margins with a protective frame 20 which preferably, but not necessarily, is made of a metal such as aluminum or stainless steel and defines a channel 22 that is sized to make a close fit with the module. A suitable sealant or gasket 24 may be provided between the edges of the module and the frame. In this illustrated embodiment, the frame has a standoff portion 26 with a depth sufficient to accommodate mounting stud assemblies for connecting the PV module to the brackets 12 and 14. The mounting stud assemblies may take various forms. A preferred form of mounting stud assembly comprises a threaded stud 30 having a head 32. Mounted on each stud are two washers 34 and 36 and a spacer sleeve 38 that keeps those washers spaced apart a selected distance. Studs 30 are mounted in holes in frame 20 and are secured in place by nuts 42, preferably with addition of another washer 44. Each stud is locked against axial movement relative to the frame by tight engagement of opposite sides of standoff portion 26 by washers 36 and 44. Each module is provided with four mounting stud assemblies, each adjacent a different corner of the PV module.

Figure 5:
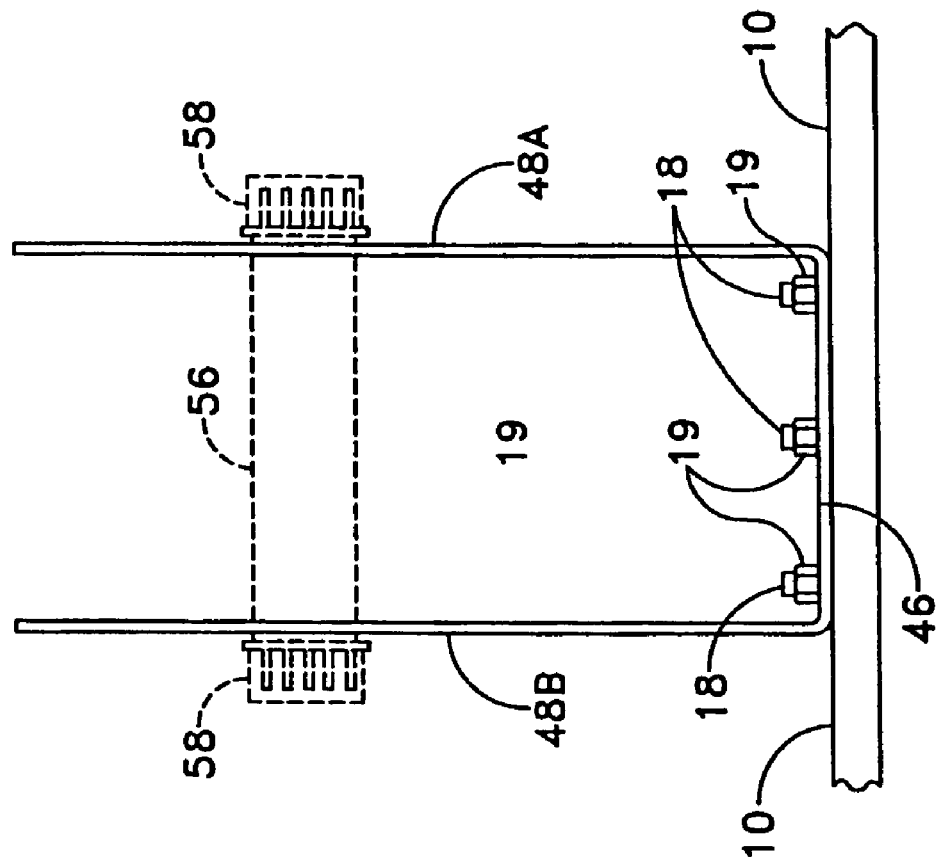
FIG. 5 is a front view in elevation of one of the taller fixed height brackets.
Figure 6:
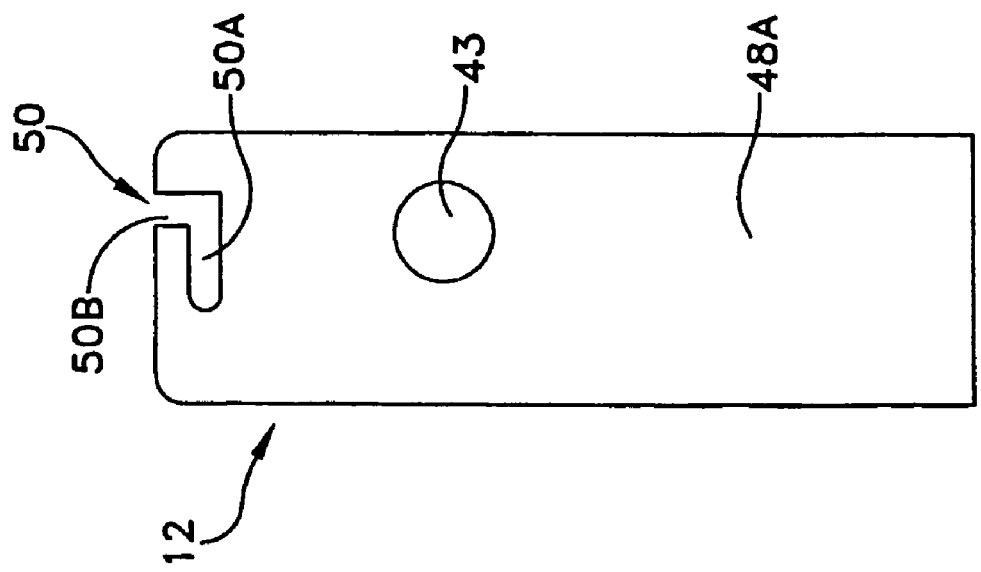
FIG. 6 is a side view in elevation of the same bracket.

Referring to FIGS. 5 and 6, the taller brackets 12 have a U-shaped configuration and comprising a flat base portion 46 and a pair of module-supporting members in the form of vertically-extending arms 48A and 48B. Each base portion 46 is provided with a plurality of openings to accommodate the threaded studs 18 of the associated base plate. Nuts 19 on studs 18 releasably anchor brackets 12 to base plates 10. The upper ends of arms 48A and 48B are provided with identical L-shaped slots 50 comprising horizontal portions 50A and vertical entry portions 50B that are used to receive mounting studs 30 on the PV modules. Additionally, arms 48A and 48B of brackets 12 may be provided with enlarged openings 54 to accommodate a nipple 56 (shown in phantom in FIG. 5) that serves as a protective conduit for electrical wires (not shown) that are used to interconnect the modules. The nipples are secured to brackets 12 by means of bushings 58 (also shown in phantom) that are attached to the opposite ends of the nipples by screw connections or some other suitable connecting means.

To the extent described above, and with the exception of brackets 14, the apparatus shown in FIGS. 1-6 is substantially the same as the apparatus disclosed in my copending application Ser. No. 10/506,145. Details of the apparatus disclosed and illustrated in that copending application are incorporated herein by reference.

Figure 7:
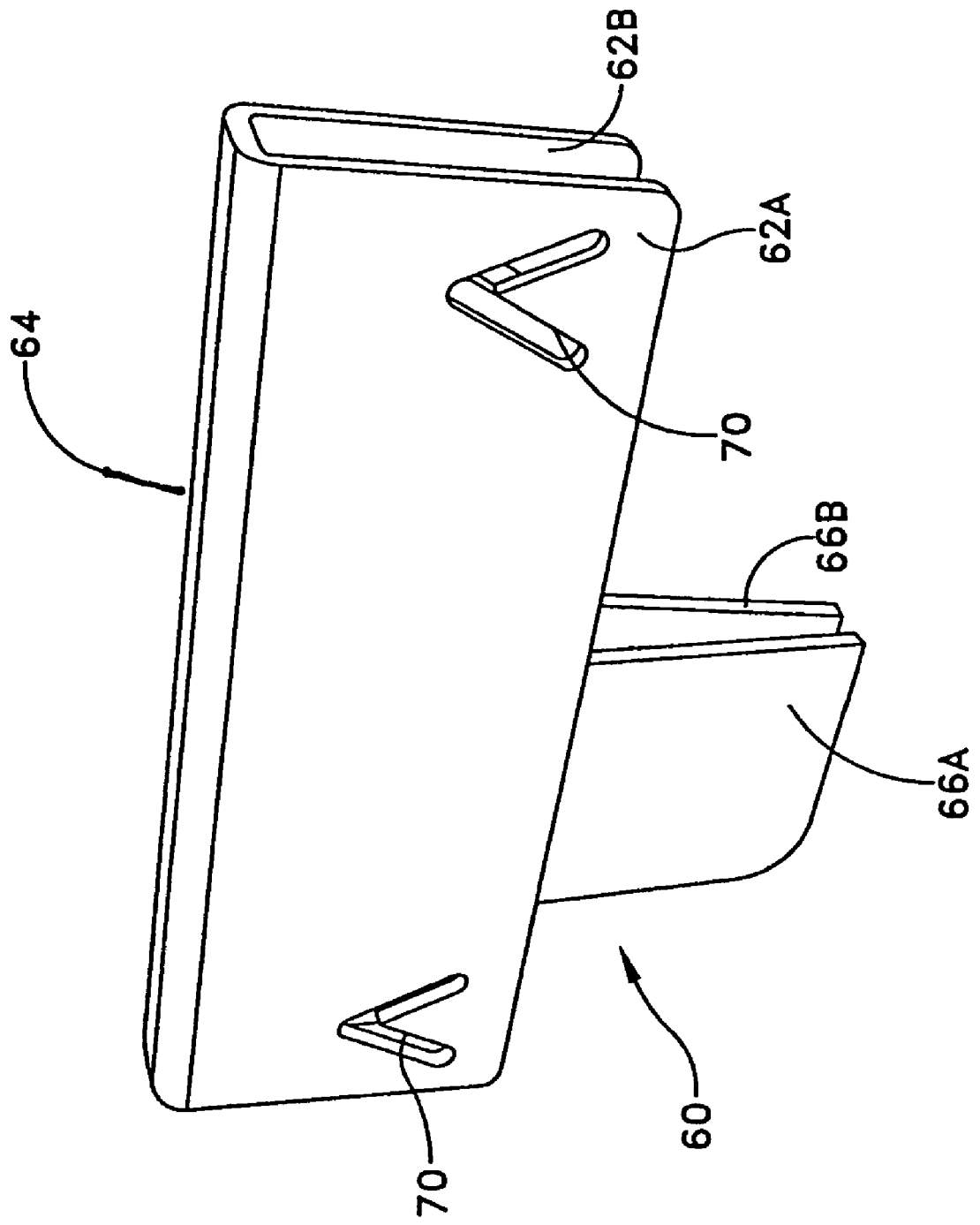
FIG. 7 is a perspective view of a pin trap provided in accordance with the present invention.
Figure 8:
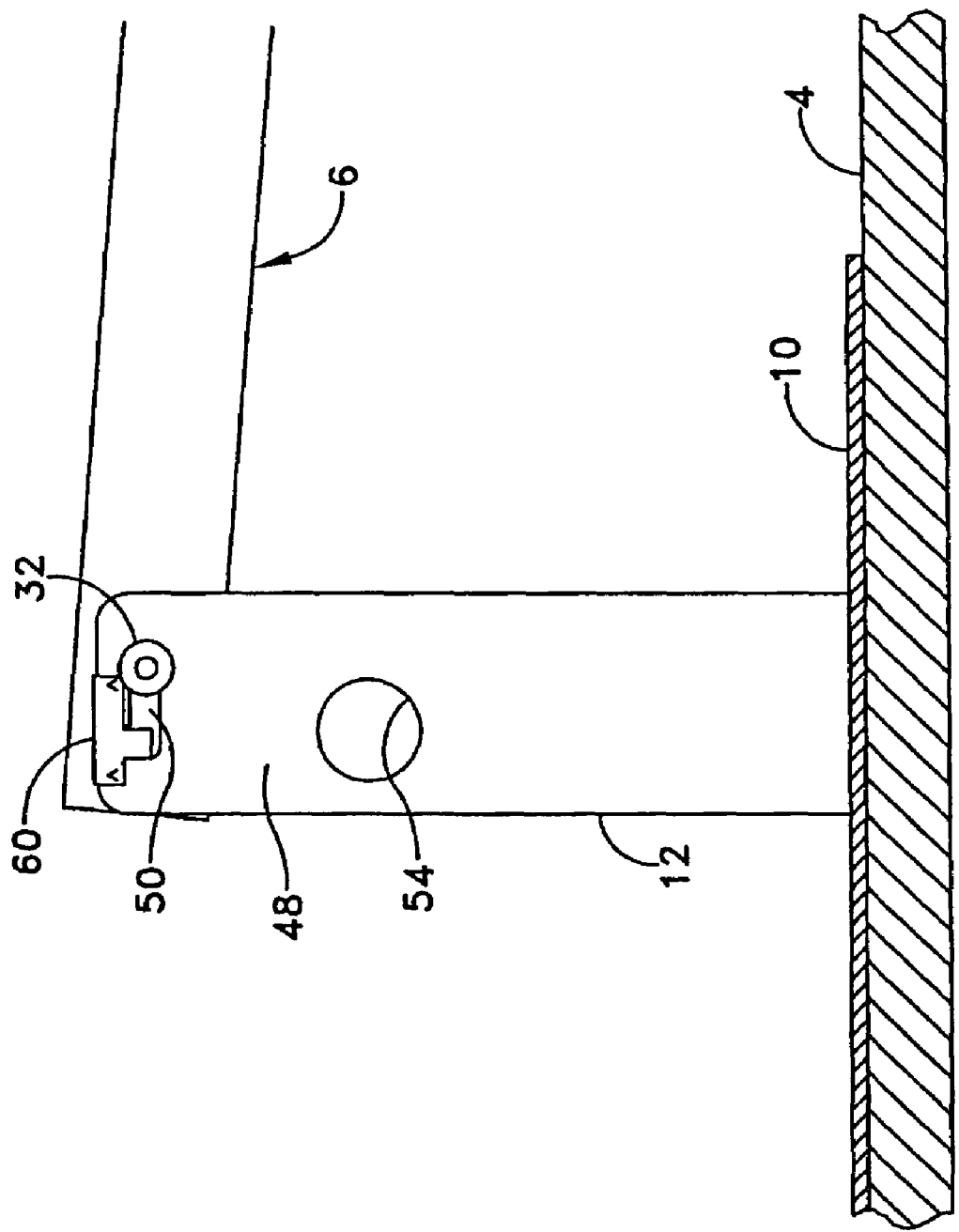
FIG. 8 is a fragmentary view illustrating how a module is connected to one of the taller brackets.

Referring now to FIGS. 7 and 8, for the purposes of the present invention the L-shaped slots 50 in the arms 48A and 48B of brackets 12 are closed off by pin trap members 60. The latter are preferably formed of sheet metal and have a U-shaped cross-sectional shape, comprising a pair of opposite side walls 62A and 62B and a connecting top wall 64. Formed integral with and projecting down from side walls 62A and 62B are two legs 66A and 66B respectively. These legs are bent inwardly so that their bottom ends converge on one another. Additionally each of the side walls 62A and 62B are die cut to form V-shaped prongs 70 that extend inwardly toward the opposite side wall. Each pin trap member is sized to fit over the top edge of arm 48A or 48B of a bracket 12, with its prongs biting into and making a gripping contact with the adjacent side surface of that arm 48A or 48B and the legs 60A and 60B extending into the horizontal portions 50A of the L-shaped slot. The legs 66A and 66B reduce the effective length of the horizontal portions 50A of the L-shaped slot with respect to mounting studs 30, while the side walls 62A and 62B and top wall 64 close off the vertical entry portion 50B of the same slot.

Figure 9:
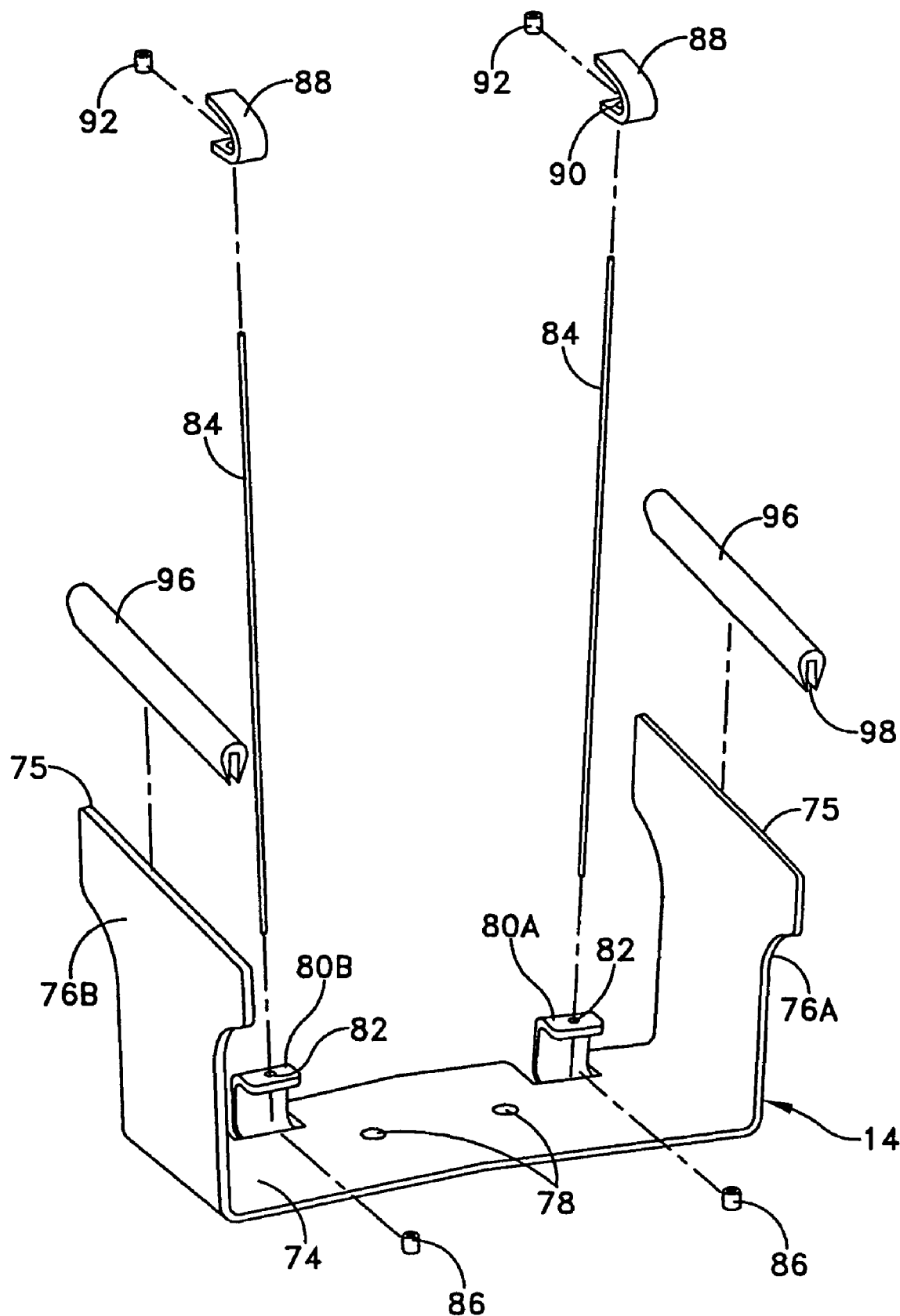
FIG. 9 is an exploded perspective view of one of the shorter tether-type brackets and associated components.
Figure 10:
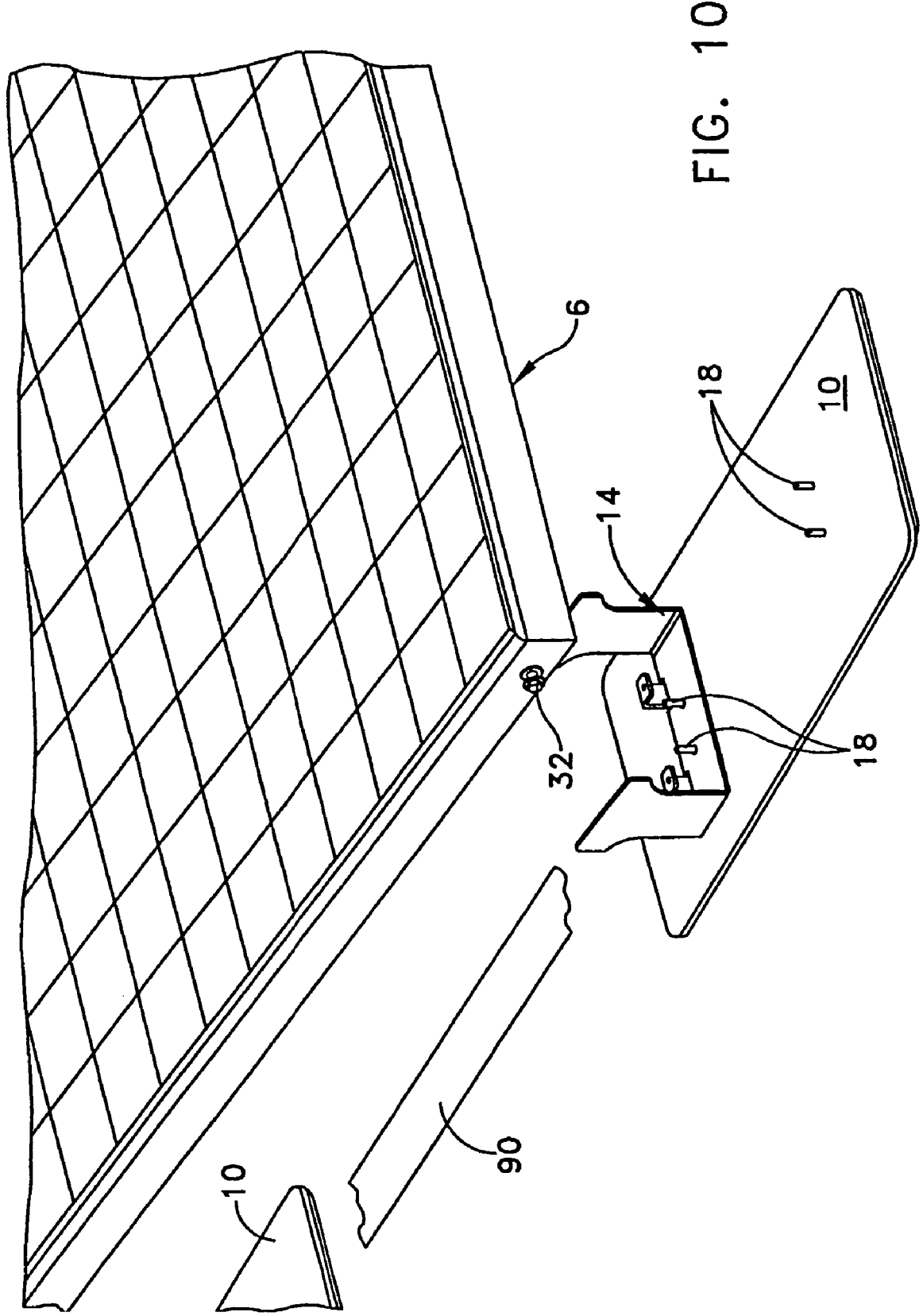
FIG. 10 is a fragmentary perspective view illustrating a PV module resting on a tether-type bracket provided by the present invention.
Figure 11:
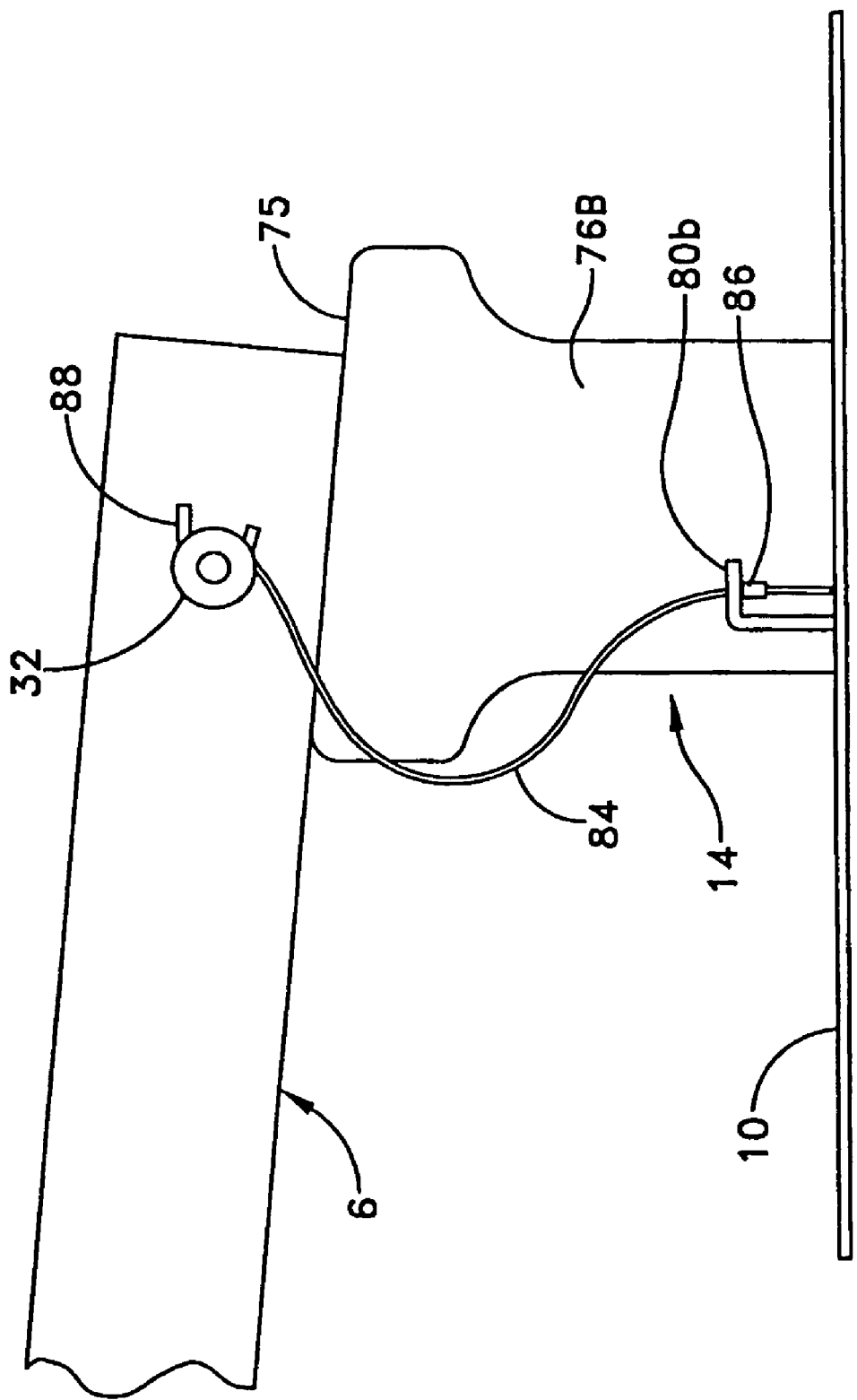
FIG. 11 is a fragmentary view illustrating how a module is supported by and tethered to one of the shorter brackets.

Referring now to FIGS. 9-11, each of the other brackets 14 has a U-shaped configuration and comprises a flat base portion 74 and a pair of module-supporting members in the form of vertically-extending arms 76A and 76B. Base portion 74 has a pair of openings 78 to accommodate the threaded studs 18 of the associated base plate 10. Nuts (not shown but like nuts 19) are threaded onto the upwardly-projecting studs 18 to anchor the base portions 74 of brackets 14 to base plates 10. The upper end edges 75 of arms 76A and 76B are slanted at an angle equal to the desired angle of repose of the PV modules, i.e., the angle at which the modules rest in the absence of any uplifting wind force. For a flat roof located in the U.S.A., that angle typically is in the range of about 5 to about 15 degrees.

Each bracket 14 also is formed with two L-shaped anchor members 80A and 80B located along one edge of its base portion 74. Each of these anchor members has a hole 82 to receive a tether in the form of a flexible metal cable 84 that serves as a tether as hereinafter described. The end of the metal cable that extends down through hole 82 is fitted with a sleeve 86 that is secured in place by crimping it to the cable. Sleeve 86 has an outside diameter greater than hole 82, whereby the sleeve can function as a stop to prevent the cable from being pulled free of bracket 14. The opposite end of cable 84 is secured to a U-shaped spring metal clip 88 that is attached to one of the mounting studs of studs 30 as hereinafter described. One end of each clip is provided with a hole 90 through which cable 84 extends, and a second sleeve 92 is secured to that end of the cable to prevent it from pulling free of the clip. That sleeve 92 also functions to engage the stud 30 on which the clip is mounted, thereby preventing the clip from slipping off of the stud when the cable is subjected to tension.

Mounting a plurality of PV panels 6 on a roof by means of the present invention involves first placing a plurality of stands 2 on a roof in a grid pattern of rows and columns as shown, with the rows extending in an east-west direction. The stands are all oriented in the same direction with the taller brackets 12 disposed north of the shorter brackets 14. The brackets 14 of the stands in one row face the brackets 12 of the stands in the next immediate row. Also on each stand the brackets 14 are disposed so that the lower ends of the inclined top edges 75 of legs 86A and 86B face the bracket 12 of that same stand. The nuts 19 coupling the brackets 12 and 14 to studs 18 on the base plates 10 are secured, so as to lock those brackets to the base plate.

Then individual modules 6, each with mounting pins 30 at their four corners, are attached to brackets 12 and 14. Each module in turn is positioned so that two of its four mounting studs 30 are inserted into slots 50 of one of the arms 48A or 48B of brackets 12 of adjacent stands 2 in one row. Then pin trap members 60 are applied to each bracket 12 so as to lock the mounting studs 30 in slots 50 and the other two of its four mounting studs are connected to two different brackets 14 by means of cables 84 as described above. Cables 84 have a length such as to allow the modules to pivot upwardly to a substantially horizontal position. By way of example, the cables have a length such as to permit the modules to move up away from the brackets 14 so as to provide a gap of several inches between the module and the upper ends of those brackets.

As disclosed in said copending application Ser. No. 10/506,145 but not shown herein, the modules in the array are connected by electrical cables and related connector means to each other and also to the electrical system of building on which the array of modules is mounted.

To summarize, the arms 48A and 48B of each bracket 12 are engaged by locking stud assemblies of two different solar module, and the L-shaped members 80A and 80B of each bracket 14 are tethered by cables 84 to locking stud assemblies of two different solar module, i.e., each bracket 12 and 14 is connected to and supports two different modules, with brackets 12 and 14 of each stand being connected to four different PV modules.

Using the tethers to couple the brackets 14 to modules 6 is advantageous in that the modules are free to pivot move upwardly about the brackets 12 to the extent permitted by the length of the tethers. In the absence of any uplifting wind forces, the modules will rest on the arms 76A and 76B of brackets 14. When extreme winds occur, the ends of the modules resting on brackets 14 will respond to pressure differentials, with those ends of the PV modules moving upward to release wind pressure and reducing or substantially eliminating excessive wind uplift forces on the modules and the stands 2. With this dynamic feature, every PV module (or PV assembly where two or more PV modules are ganged together) can independently adjust its tilt angle to eliminate uplift forces from high velocity winds. In this connection it should be noted that an important aspect of the invention is that all of the PV modules are mechanically linked together by the mounting stands, thereby aiding in resisting movement under the force of winds.

As an optional measure, the base plates 10 of each pair of north/south aligned stands 2 that support the modules in the northernmost row of modules are connected together by flat bars 90 (FIG. 10). Similar flat bars connect together the base plates of corresponding north/south aligned stands 2 that support the modules in the southernmost row of modules. The bars 90 extend over the base portions 46 and 74 of brackets 12 and 14 and have openings that permit them to be secured in place by the threaded studs 18 and nuts 19. The bars 90 provide a stabilizing and strengthening factor to the array of modules.

The form of PV module is not critical to this invention and may take various forms well known in the art. For that reason, and also for convenience of illustration, the internal structure of the module is not illustrated. Suffice it to say that the module has a square or rectangular configuration. By way of example but not limitation, PV modules commonly are in the form of a laminated sandwich that comprises a front panel made of transparent glass, a back panel made of glass, Tedlar®, or some other material, and a plurality of interconnected photovoltaic cells and a transparent encapsulant disposed between the front and back panels in a hermetically sealed arrangement. A metal frame protects the edges of the laminated components and also facilitates mounting. This form of PV module is described and illustrated in U.S. Pat. No. 5,228,924, issued Jul. 20, 1993 to James M. Barker et al., and U.S. Pat. No. 5,478,402, issued Dec. 26, 1995 to Jack I. Hanoka. U.S. Pat. No. 5,228,924 also shows how a plurality of PV modules can be ganged together to form a multi-module assembly.

The invention is susceptible of modifications. For one thing, the manner of attaching the tethers to the modules or to the brackets 14 may be changed, e.g., each cable 84 may be formed with a loop at its top end that is large enough to fit on a stud 30 but small enough so as to be restrained by the studs head 32. Another optional modification is to apply protective resilient covers 96 (FIG. 9) to the top edges 75 of brackets 14 to prevent damage to the module and also reduce any noise produced by the modules impacting on legs 76A and 76B on returning to their normal at-rest positions after being lifted by wind forces. Covers 96 have grooves 98 sized to accommodate the top edge portions of brackets 14. These covers may be adhesively bonded to the top edges of brackets. The function of the nipple 56 may instead be provided by a length of metallic tube suitably secured to the bracket 12 by welding or other means. Other possible modifications and additions will be obvious to persons skilled in the art.

As used in the following claims, the term "PV" is an acronym for the word "photovoltaic".

What is claimed is:

1. A photovoltaic assembly comprising a plurality of photovoltaic modules each having first and second opposite ends and first and second opposite sides extending between said opposite ends;

a plurality of mounting stands for said photovoltaic modules arranged in rows and columns, each of said mounting stands comprising a base plate for placement on a supporting roof structure, first and second mutually spaced module-supporting members attached to said base plate, and third and fourth mutually spaced module-supporting members attached to said same base plate and spaced from said first and second module-supporting members respectively, each of said photovoltaic modules at said first opposite end resting on first and second module-supporting members of first and second mutually adjacent mounting stands respectively and at said second opposite end having its first and second opposite sides pivotally connected to third and fourth module-supporting members of third and fourth mutually adjacent mounting stands respectively, each photovoltaic module being free to pivot upwardly out of engagement with said first and second module-supporting members of said first and second mutually adjacent mounting stands respectively in response to wind uplift forces; and first and second flexible tethers connecting each photovoltaic module at said first opposite end thereof to said first and second mutually adjacent mounting stands respectively, whereby to limit the extent that said first ends of said modules can move upwardly out of engagement with said first and second mutually adjacent mounting stands in response to wind uplift forces.

2. A photovoltaic assembly in combination with a building roof, said assembly comprising:

a plurality of photovoltaic modules each having first and second opposite ends and first and second opposite sides extending between said opposite ends; and a plurality of mounting stands for said photovoltaic modules distributed on said roof, each of said mounting stands comprising a base plate resting on said roof, first and second photovoltaic module-supporting members mounted to said base plate in spaced side-by-side relation with one another, and third and fourth photovoltaic module-supporting members mounted to said same base plate in spaced side-by-side relation with one another and in spaced relation with said first and second photovoltaic module-supporting members, all of said photovoltaic module-supporting members extending upwardly from said base plate away from said roof with said first and second photovoltaic module-supporting members extending upwardly further than said third and fourth photovoltaic module-supporting members, each of said photovoltaic modules (a) at its first opposite end being pivotally connected to the first and second photovoltaic module-supporting members of first and second adjacent mounting stands and (b) at its said second opposite end resting on and being supported by the third and fourth photovoltaic module-supporting members of third and fourth adjacent mounting stands in tilted relation to said roof, said plurality of mounting stands including said first, second, third and fourth mounting stands, and each of said modules being free to pivot at said first opposite end thereof to permit said second opposite end thereof to move up out of engagement with said third and fourth photovoltaic module-supporting members;

first and second tethers associated with each photovoltaic module at said second end of said each photovoltaic module;

said first and second tethers being attached at one end to said first and second opposite sides respectively of said each photovoltaic module adjacent said second opposite end thereof; and being connected at the opposite end to said third and fourth mounting stands;

said first and second tethers having a length that is sufficient to (a) allow said each photovoltaic module to pivot upwardly out of engagement with said third and fourth photovoltaic module-supporting members in response to wind uplift forces and (b) stop upward pivoting movement when said each module reaches a predetermined angular position.

3. Apparatus according to claim 2 wherein each of said first and second tethers comprises a metal cable.

4. Apparatus according to claim 2 wherein each of said third and fourth mounting stands comprises first and second anchor members adjacent to said third and fourth photovoltaic module supporting members, and further wherein said first tether is secured to one of said first and second anchor members of said third mounting stand and said second tether is secured to one of said first and second anchor members of said fourth mounting stand.

5. Apparatus according to claim 2 wherein each module is rectangular and has first and second mounting studs projecting outwardly from said first opposite side thereof and third and fourth mounting studs projecting outwardly from said second opposite side thereof, with said first and third studs being located adjacent said first opposite end of the module and said second and fourth studs being located adjacent said second opposite end of the module, said first and third studs being pivotally attached to said first and second photovoltaic first module-supporting members of said first and second mounting stands.

6. Apparatus according to claim 5 wherein said first and second photovoltaic module-supporting members have openings in which said first and second studs are received so as to pivotally lock said photovoltaic modules to said first and second module-supporting members.

7. Apparatus according to claim 2 wherein each of said first, second, third and fourth module-supporting members extend a fixed distance from said base plate.

8. Apparatus according to claim 2 wherein said stands are distributed on said roof in rows and columns, and each of said photovoltaic modules is (a) pivotally connected at said first opposite end thereof to a module-supporting member of a first mounting stand in one row and a module-supporting member of a second mounting stand in an adjacent row, and (b) at said second opposite end thereof by a module-supporting member of a third stand in said one row and a module-supporting member of a fourth stand in said adjacent row.

9. Apparatus according to claim 2 wherein said first and second photovoltaic module-supporting members of each stand are integral parts of a first bracket that is secured to the said base plate of said each stand and said third and fourth photovoltaic module-supporting members of each stand are integral parts of a second bracket that is secured to the said base plate of said stand.

10. A photovoltaic assembly in combination with a building roof, said assembly comprising:
a plurality of photovoltaic modules each having first and second opposite ends and first and second opposite sides extending between said opposite ends;
a plurality of mounting stands for said photovoltaic modules distributed on said roof in rows and columns, each of said mounting stands comprising a single base plate resting on said roof and first and second mutually spaced brackets each comprising a base portion secured to said single base plate, said first bracket comprising first and second module-supporting members extending upwardly away from said base plate in side-by-side spaced relation with one another and said second bracket comprising third and fourth module-supporting members in side-by-side spaced relation with one another, said first and second module-supporting members being spaced from said third and fourth module-supporting members;
each of said photovoltaic modules being pivotally connected at said first opposite side adjacent said first end thereof to said first module-supporting member of said first bracket of a first mounting stand in a first one of said rows and at said second opposite side adjacent said first end thereof to said second module-supporting member of said first bracket of a second adjacent mounting stand in a second row adjacent to said first row, each of said photovoltaic modules also resting at said second end thereof on said third module-supporting member of said second bracket of a third adjacent mounting stands in said first row and on said fourth module-supporting member of a fourth mounting stand in said second adjacent row, each of said photovoltaic modules being free to pivot at said first ends and said second ends of each photovoltaic module being free to lift off of said third and fourth module supporting members in response to wind uplift forces; and
first and second tethers connecting two points of each photovoltaic module at said second ends thereof to said third and fourth adjacent mounting stands, said tethers having an effective length that allows said each photovoltaic module to pivot up a predetermined maximum distance away from the third and fourth module-supporting members on which it rests.

11. Apparatus according to claim 10 wherein said first and second module-supporting members of said first bracket have a height that is greater than that of said third and fourth module-supporting members of said second bracket, and further wherein each photovoltaic module is tilted relative to said roof when it is resting on said third and fourth module-supporting members.

12. Apparatus according to claim 11 wherein said roof is substantially horizontal and said tethers have a length that allows said photovoltaic modules to pivot up to a position substantially parallel to the plane of said roof.

13. Apparatus according to claim 10 wherein said first or second brackets are movable on said base plate, whereby to adjust the distance between said first and second brackets on said base plate.

14. Apparatus according to claim 10 wherein said first and second module-supporting members comprise arms that extend parallel to one another and at a right angle to said base plate.

15. Apparatus according to claim 10 wherein said base plates are elongate and have a longitudinal axis, and further wherein said first and second brackets are U-shaped and made of sheet metal, with said module-supporting members of each bracket extending parallel to one another and also to the longitudinal axis of said base plate.

* * * * *